(12) United States Patent
  Cridand

(10) Patent No.: US 10,668,737 B2
(45) Date of Patent: Jun. 2, 2020

(54) LABEL IMAGING AND CUTTING

(71) Applicant: DATALASE LIMITED, Widnes (GB)

(72) Inventor: John Cridand, Widnes (GB)

(73) Assignee: Datalase Limited, Widnes (GB)

( * ) Notice: Subject to any disclaimer, the term of this patent is extended or adjusted under 35 U.S.C. 154(b) by 0 days.

(21) Appl. No.: 15/504,899

(22) PCT Filed: Jul. 31, 2015

(86) PCT No.: PCT/GB2015/052217
§ 371 (c)(1),
(2) Date: Feb. 17, 2017

(87) PCT Pub. No.: WO2016/027061
PCT Pub. Date: Feb. 25, 2016

(65) Prior Publication Data
US 2017/0275041 A1    Sep. 28, 2017

(30) Foreign Application Priority Data

Aug. 20, 2014 (GB) .................................. 1414822.5

(51) Int. Cl.
*B65C 9/18* (2006.01)
*B23K 26/38* (2014.01)
(Continued)

(52) U.S. Cl.
CPC .............. *B41J 2/442* (2013.01); *B23K 26/38* (2013.01); *B41J 2/4753* (2013.01); *B41J 3/4075* (2013.01);
(Continued)

(58) Field of Classification Search
CPC ........... B65C 9/1803; B65C 2009/1846; B41J 3/4075; B41J 11/663; B41J 2/4753; B41M 5/30
See application file for complete search history.

(56) References Cited

U.S. PATENT DOCUMENTS 5,650,076 A *  7/1997  Ben-David ........ B23K 26/0846
                                                           219/121.7
6,191,382 B1 *  2/2001  Damikolas ............. B23K 26/04
                                                           156/272.8
(Continued)

FOREIGN PATENT DOCUMENTS

JP      2002067389 A     3/2002
WO    WO-2005037478 A2   4/2005
(Continued)

OTHER PUBLICATIONS

UK Search Report dated Mar. 10, 2015, 3 pages.
International Search Report of PCT International Application No. PCT/GB2015/052217 dated Nov. 11, 2015, 3 Pages.

*Primary Examiner* — Alessandro V Amari
*Assistant Examiner* — Kendrick X Liu
(74) *Attorney, Agent, or Firm* — Adler Pollock & Sheehan P.C

(57) ABSTRACT

The present invention discloses a method and apparatus for imaging and cutting a label from a linerless label substrate 6, the substrate 6 comprising: a paper or polymeric film base layer; a colour change layer, incorporating a colour change compound operable to change colour in response to illumination by a laser 1; an adhesive layer; and a release layer adapted to have low adherence to the adhesive layer. The label substrate 6 is transported from a storage reel to an imaging area. At the imaging area, the label substrate 6 is selectively illuminated by laser 1 to form an image in the colour change layer. Subsequently, further laser illumination is used to cut the label substrate 6 thereby providing a single label for application to an object. The invention is characterised in that the laser spot size is varied for imaging and cutting.

11 Claims, 4 Drawing Sheets

(51) Int. Cl.
- *B41J 3/407* (2006.01)
- *B41J 11/66* (2006.01)
- *B41J 11/70* (2006.01)
- *B41J 2/475* (2006.01)
- *B41J 2/44* (2006.01)
- *B41M 5/30* (2006.01)
- *B41M 5/32* (2006.01)
- *B41M 5/333* (2006.01)
- *B41M 5/323* (2006.01)
- *B23K 103/00* (2006.01)

(52) U.S. Cl.
CPC ............ *B41J 11/663* (2013.01); *B41J 11/703* (2013.01); *B41M 5/30* (2013.01); *B65C 9/1803* (2013.01); *B23K 2103/40* (2018.08); *B41M 5/32* (2013.01); *B41M 5/323* (2013.01); *B41M 5/333* (2013.01)

(56) References Cited

U.S. PATENT DOCUMENTS

| | | | |
|---|---|---|---|
| 2003/0034093 A1* | 2/2003 | Morris | B23K 26/0736 148/197 |
| 2004/0228004 A1* | 11/2004 | Sercel | B23K 26/0608 359/668 |
| 2007/0285488 A1* | 12/2007 | Ishimi | B41J 2/471 347/179 |
| 2010/0053299 A1* | 3/2010 | Govorkov | B31D 1/027 347/244 |
| 2010/0097436 A1 | 4/2010 | Spinelli et al. | |

FOREIGN PATENT DOCUMENTS

| | | |
|---|---|---|
| WO | WO-2013070068 A1 | 5/2013 |
| WO | WO-2013082101 A2 | 6/2013 |
| WO | WO-2014096833 A1 | 6/2014 |

* cited by examiner

LABEL IMAGING AND CUTTING

CROSS REFERENCE TO RELATED APPLICATIONS

This application is a national phase filing under 35 U.S.C. § 371 of International Application No. PCT/GB2015/052217 filed Jul. 31, 2015, which claims priority from Great Britain application number 1414822.5, filed Aug. 20, 2014, the entire contents of each are hereby incorporated by reference herein.

TECHNICAL FIELD OF THE INVENTION

The present invention relates to a label printing and cutting, in particular to a method and apparatus for printing and cutting linerless labels. Most particularly, the method and apparatus are provided with one or more lasers operable both to generate images in or on the label using a colour change technology and to cut or perforate the label.

BACKGROUND TO THE INVENTION

Inkless printing of labels is an alternative to traditional label printing techniques such as inkjet or thermal transfer where a pigment is applied to a label substrate. The inkless method utilises a substrate whose physical properties (in particular its colour) can be altered upon irradiation with patterns of radiation.

Label application methods and apparatus are well known in the packaging industry. Typically, many label application methods operate using pre-cut labels supported on a backing liner. Each label may be printed with an identical design or may have regions printed with variable information. The labels and backing liner are rewound after printing onto a reel. The reel can be fitted to a label applicator so as to draw forward a continuous strip of liner and labels. The labels are then separated from the liner and applied to an object (typically a package, case, box, carton or product). One example of such labels is marketed by Macsa id wherein pre-cut labels are provided on a backing liner and a CO2 laser is used to form an image on the labels.

The above techniques all have the disadvantages the backing liner is waste and needs to be disposed of or recycled. Additionally, the backing liner adds thickness, which limits the number of labels that can be provided on a reel for use in a labelling apparatus. Furthermore, use of pre-cut labels requires an additional level of complexity in manufacturing since the labels must be cut after formation on the backing liner.

In view of the above issues, efforts have been made to develop linerless labels. In order to apply individual labels printed on a continuous strip of label substrate to a succession of objects, it is necessary to cut the label substrate. One well known technique is to use a mechanical blade to cut the substrate. This has the disadvantage that the blade wears over extended use and must be replaced. Additionally, the blade accumulates debris and adhesive during use and thus requires regular cleaning.

In order to avoid the use of mechanical blades attempts have been made to provide preformed perforations into label substrate. With this approach, it is not possible to adjust the length of label at the point of application even if the size of the imaged region can be modified by the printing or imaging system. Moreover, variation in tension applied to the label substrate (or indeed variations in the perforations) can cause premature tearing of the perforations, particularly when the strip of label substrate is rewound during the manufacturing process. It is therefore necessary to implement the rewind process at a significantly lower tension than normal which leads to a larger diameter reel for a given length of label substrate. Typically, the reduction in tension during rewind leads to a reel diameter that is not significantly smaller than a reel of labels on a backing liner. Therefore any benefit of removing a liner from the label with regard to increasing in the interval to reload the machine is lost.

In our co-pending UK patent application No. 1506312.6 (and family), a linerless label printing method and apparatus is disclosed using laser illumination means both for imaging and for cutting of individual labels at the correct location. To minimise cost, it is preferable to use a single laser illumination means to both image and cut the labels cutting and imaging operation being distinguished by varying the power output of the laser illumination means and the scan speed of the laser spot. Typically, imaging operation might be carried out at say 25% of maximum power output with a scan speed of 6000 mm/s whilst cutting operation may require 100% power output with a scan speed reduced to 300 mm/s. One of the problems with using the same laser illumination means for marking and cutting is that the spot size optimised for marking is not optimum for cutting. Typically, with the key limitation upon speed of imaging being provided by the difficulties in increasing scan speed, a larger spot size is favoured for imaging. Nevertheless, the optimum spot size for writing text may be different to the optimum spot required for imaging large linear bar codes.

The larger spot size required for marking means that when the laser needs to cut the time required for this operation is longer, increasing costs. Additionally, the kerf cut width is wider than is desirable, potentially increasing the impact on the fume extraction system and thereby limiting filter lifetime in said extraction system.

Even with a relatively large spot size for imaging, large linear bar codes may require between 1 and 6 scans per dark bar. Requiring multiple scans limits the maximum imaging rate of the label. Whilst this can be addressed by increasing the spot size further, this would have an even more significant impact on the cutting operation.

It is therefore an object of the present invention to provide an improved method and apparatus for printing and cutting labels that at least partially overcomes or alleviates the above problems.

SUMMARY OF THE INVENTION

According to a first aspect of the present invention there is provided a method of printing and cutting a label for application to a product, the method comprising the steps of: providing a strip of label substrate, the label substrate comprising a colour change layer; selectively exposing a section of the label substrate to radiation from laser illumination means to induce colour change in the colour change layer and thereby form a printed image; and cutting the label substrate using said laser illumination means characterised in that the spot size of the laser is varied for imaging and for cutting.

According to a second aspect of the present invention there is provided a label printing and cutting apparatus suitable for use with a strip of label substrate, the label substrate comprising a colour change layer in which a printed image may be formed, the apparatus comprising: a label store for retaining and supplying a strip of label substrate; transport means for transporting label substrate from the store to an imaging area; and laser illumination means operable to selectively illuminate the label substrate as it is transported through the imaging area so as to induce colour change in the colour change layer thereby forming the printed image, the laser illumination means further operable to cut the label substrate as it is transported through the imaging area characterised in that the laser illumination means comprises laser spot size adjustment means operable to vary the spot size of the laser for imaging and for cutting.

The present invention therefore provides a method and apparatus by which label stock may be printed and cut to provide labels of any suitable size. Furthermore, the present invention enables the printing and cutting of labels at increased speed as the spot size of the laser illumination means can be optimised for each activity. In particular, increasing the spot size for imaging can significantly increase the imaging rate, whilst reducing the spot size for cutting can enable a narrower kerf cut, reducing the amount of material removed from the label substrate in the cutting operation. This beneficially extends the time between filter replacements in any associated fume extraction system.

The method may include the step of determining the position of the edge of the printed image before cutting. The apparatus may comprise a position sensor for determining the position of the edge of the printed image. In such embodiments, cutting of the label substrate may be initiated as it is transported through the imaging area in response to the to the position sensor. The position sensor may comprise an optical sensor operable to determine the location of the edge of the image by detecting: an edge of the image; and/or a registration mark identifying the edge of the image. Alternatively, the position sensor may comprise a transport sensor operable to determine, based on the size of the printed image and the operation of the transport means, the location of the edge of the printed image.

The label substrate may comprise a linerless label substrate. Alternatively, the label substrate may be supported on a backing liner.

The method may include the additional step of applying a cut and printed label to an object. This can be achieved by use of an applicator. The applicator may comprise a roller or brush operable to press the label on to the object.

The transport means may comprise one or more belts or rollers. In a preferred embodiment, the transport means comprises a support belt formed from a material adapted such that it does not bond with the adhesive layer. This can allow the transport means to support the label during selective illumination.

Preferably, the cutting takes place at a cutting region. The cutting region may be beyond the end of the support belt. In this manner, damage is not caused to the support belt during cutting. Alternatively, the cutting region may be provided between one or more belts or rollers. In an alternative embodiment, a shield is provided to protect the transport means during the cutting operation.

The store may comprise a spindle. The spindle may be adapted to retain a reel of label substrate.

In order to selectively illuminate the section of the label substrate, the label may be transported past the laser illumination means substantially continuously or in indexed steps. Additionally, or alternatively, the label substrate may be stopped during selective illumination. This can enable the formation of higher definition images or higher definition sections within images. This is particularly advantageous for printing barcodes within images.

The laser illumination means may be provided with a scanning unit operable to direct the generated laser beam onto selected areas of the substrate for printing and/or cutting. The scanning unit may additionally be provided with image focussing means for focussing the generated laser beam on to the label substrate for imaging. The image focussing means may be provided before or after the beam enters the scanning unit.

The generated laser beam may be expanded before being directed onto selected areas of the substrate for printing and/or cutting. This can ensure a sufficiently small spot is generated with the required image field size. Beam expansion may be achieved by the provision of a beam expander positioned between the laser illumination means and the scanning unit.

The laser spot size adjustment means may comprise a cutting beam deflector operable to deflect the beam from the scanning unit through cut focussing means. The cutting beam deflector may comprise a mirror, prism grating or the like.

The cutting beam deflector may be moveable so as to intercept the beam directed by the scanning unit. Alternatively, the scanning unit may be operable to direct the beam into the cutting beam deflector, in some embodiments by deflecting the beam out of imaging range. The cut focussing means may be operable to focus the received beam on to the label substrate for cutting. Most preferably, the cut focussing means are operable to focus the beam into a smaller spot size for cutting. The cut focussing means may be operable to reduce the spot size in one dimension only or in two dimensions. The cut focussing means may comprise any suitable combination of lenses and or mirrors.

In a further embodiment, the spot size adjustment means may additionally or alternatively comprise a high speed beam deflector provided between the laser illumination means and the scanning unit. The high speed beam deflector is preferably operable to deflect the beam emitted by the laser illumination means in a direction substantially perpendicular to the scanning direction. Using the high speed beam deflector to rapidly deflect the beam perpendicular to the scanning direction provides an effective increase in the spot size in the direction perpendicular to the scanning direction.

In a further embodiment, the spot size adjustment means may additionally or alternatively comprise a variable beam expander. The variable beam expander may be operable to controllably vary the diameter and/or divergence of the beam provided to the scanning unit. In this manner the beam spot size for imaging and/or cutting can be varied. The variable beam expander may comprise one or more lenses and or mirrors. In particular, the variable beam expander may comprise two lens pairs and means for varying the separation between the lenses in each pair. The variable beam expander may be operable to vary the spot size one dimension only or in two dimensions.

In a further alternative, the spot size adjustment means may comprise one or more indexable beam deflectors operable to deflect the beam emitted from the laser illumination means into a selected one of multiple optical pathways, each pathway comprising one or more optical elements operable to vary the beam diameter and/or divergence. Preferably, each pathway has a different effect on the beam diameter and/or divergence. As such, spot size can be selected by selecting a corresponding optical pathway. The differing optical pathways may differ in effect on the spot size in one dimension only or in two dimensions. The indexable beam deflector may comprise galvanometer scanning mirrors, electro optical or acousto-optical means, or microelectromechanical (MEMS) means as desired or as appropriate.

The laser illumination means may be operable at variable power levels. In one preferred implementation, the laser illumination means may operate at a higher power level for cutting mode than for imaging.

When cutting, the laser illumination means may be operable to cut through the full thickness of the substrate or may be operable to cut through only part of the thickness of the substrate. The laser illumination means may be operable to cut across the full width of the label substrate. Alternatively, the laser illumination means may be operable so as to cut part way across the width of the label substrate and/or to cut a series of perforations across the full with of the label substrate. In order to cut a series of perforations, the laser illumination means may be operable in a pulsed mode.

The laser illumination means may have an operating wavelength in the range 200 nm to 20 μm. In particular, the laser illumination means may have an operating wave band in any one or more of the following regions: 200-350 nm; 350-400 nm; 390-450 nm; 400-410 nm; 410-450 nm; 450-700 nm; 800-1000 nm; 1-5 μm; or 9-11 μm.

In particular, the laser illumination means may be a CO2 laser. Surprisingly, it has been found that a CO2 laser enables the formation of clear images through a release layer. In such embodiments, the operating waveband of the CO2 laser may be in the standard operating region at substantially 10.6 μm. More preferably, the operating waveband of the CO2 laser may be in the P or R sub branches at substantially 9.4 μm or 10.4 μm The substrate may comprise a base layer having an adhesive layer provided on one side and colour change layer covered by a release layer on the other side. Alternatively, the substrate may comprise a base layer having a release layer provided on one side and colour change layer covered by an adhesive layer on the other side. The base layer may comprise paper or a polymeric film. Suitable polymeric films include but are not limited to polypropylene or polyethylene. Where the base layer is paper, the colour change layer may be omitted and the paper may be impregnated with a colour change material.

An NIR (near infra red) absorber may be added to the base layer and/or the colour change layer. The absorber may facilitate the transfer of energy from an NIR laser illumination means to the colour change layer. Additionally, the absorber may facilitate the transfer of energy from an NIR laser illumination means to the substrate reducing the laser fluence required for cutting. Suitable NIR laser illumination means include, but are not limited to: fibre or diode lasers with scanning systems, arrays of lasers, arrays of fibre coupled lasers or arrays of fibre lasers.

The colour change layer may comprise a metal oxyanion, a leuco dye, a diacetylene, a charge transfer agent or a diacetylene. The metal oxyanion may be a molybdate. In particular, the molybdate may be ammonium octamolybdate. The colour change layer may further comprise an acid generating agent. The acid generating agent may be an amine salt of an organoboron or an organosilicon complex. In particular, the amine salt of an organoboron or an organosilicon complex may be tributylammonium borodisalicylate.

The adhesive layer may comprise any suitable adhesives including, but not limited to: pressure-sensitive adhesives (PSA), activatable adhesives, hot melt adhesives. Preferably, the adhesive is a pressure sensitive adhesive, such as an acrylic based adhesive or a natural or synthetic rubber containing elastomer. The adhesive layer may additionally comprise: a plasticizer, a tackifier, and an adhesive base polymer. The adhesive base polymer may include, but is not limited to: butyl acrylate, styrene, methyl methacrylate, methacrylic acid, and acrylic acid. The adhesive may be transparent or opaque or any degree in between.

The release layer may be: silicone based; non-silicone based; or a mixture thereof. Suitable silicone based release layers include, but are not limited to: vinyl silicones. Examples of silicone release agents include the Syl-Off® range supplied by Dow Corning. Suitable non-silicone release layers include, but are not limited to: waxes and non-waxes, polyethylene, ethoxylated alcohols, alkyd polymers, polyvinyl alkyl carbamates. The release layer may be: solventless, solvent-based, emulsion, heat-curable or UV-curable. The release layer may be transparent to laser radiation or may have a small level of laser radiation absorption. If the release layer does have a small level of laser absorption, this can assist in image formation.

DETAILED DESCRIPTION OF THE INVENTION

In order that the invention may be more clearly understood embodiments thereof will now be described, by way of example only, with reference to the accompanying drawings, of which:

The present invention discloses a method and apparatus for imaging and cutting a label from a label substrate. In particular the present invention might be applied to imaging and cutting a label from a linerless label substrate. Such a substrate is disclosed in our co-pending UK patent application No. 1506312.6 (and family) and might comprise: a paper or polymeric film base layer; a colour change layer, incorporating a colour change compound operable to change colour in response to illumination by a laser; an adhesive layer; and a release layer adapted to have low adherence to the adhesive layer. The release layer thereby enables the label substrate to be wound on and dispensed from a storage reel.

In operation, the label substrate is transported from a storage reel to an imaging area. At the imaging area, the label substrate is selectively illuminated by a laser to form an image in the colour change layer. Subsequently, further laser illumination is used to cut the label substrate thereby providing a single label for application to an object.

Figure 1A:
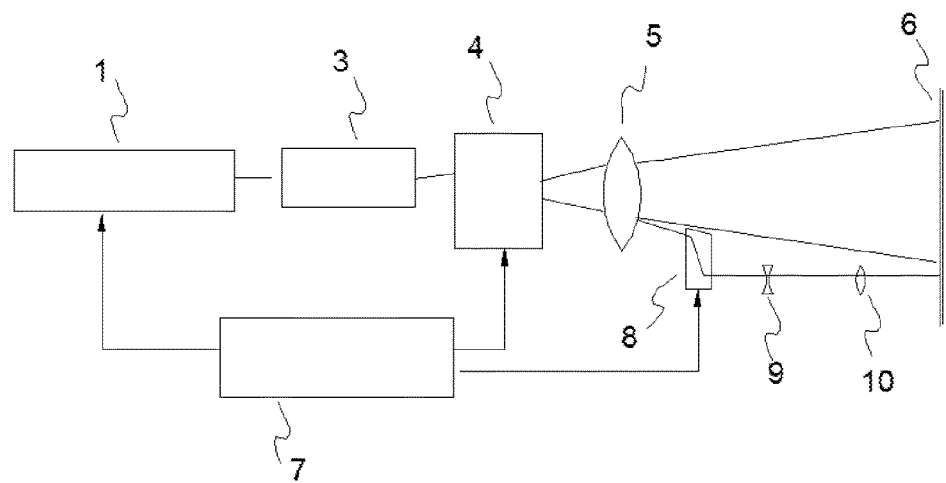
FIG. 1a is a schematic illustration of a first embodiment of an apparatus for imaging and cutting a label according to the present invention.
Figure 1B:
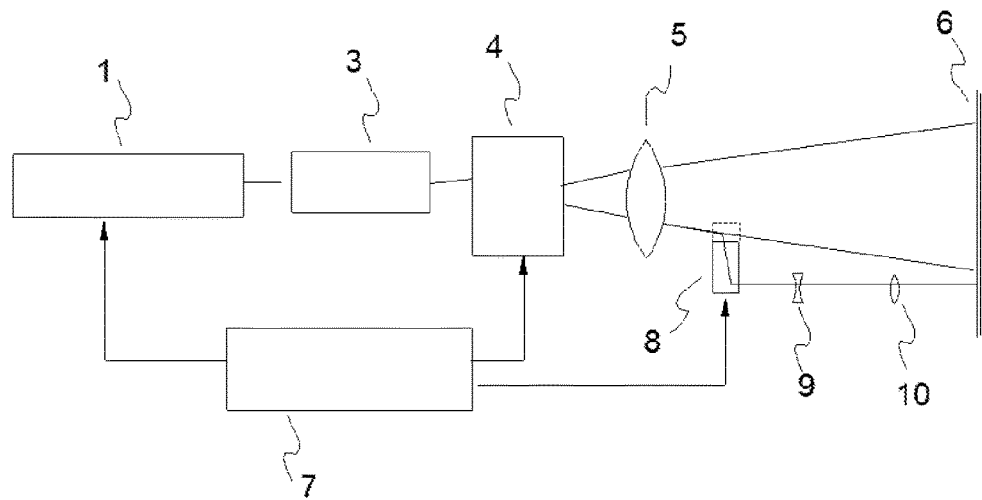
FIG. 1b is a schematic illustration of a variant of the first embodiment of an apparatus for imaging and cutting a label according to the present invention.

Turning now to FIGS. 1a and 1b, two variants on an embodiment of an apparatus for carrying out imaging and cutting of the label substrate 6 according to the present invention are illustrated schematically. In particular, the apparatus comprises a laser 1, beam expander 3, scanning unit 4, and image focussing means 5. The beam expander 3 is optional and would typically be included to ensure a sufficiently small spot is achieved. The scanning unit 4 is operable to direct the laser beam as required for imaging. The image focussing means 5 is an imaging lens selected so as to focus the directed beam from the scanning unit 4 onto the substrate 6 for imaging. Operation of the laser 1 and the scanning unit 4 is carried out in response to signals from the controller 7.

In addition to the above, the apparatus is also provided with laser spot size adjustment means. In this embodiment, the spot size adjustment means comprise cutting beam deflector 8, and cut focussing means 9, 10. The cutting beam deflector 8 may comprise an optical element such as a mirror, prism, standard grating or holographic grating. Indeed, it is also possible for the cutting beam deflector to comprise a combination of such elements. The cut focussing means 9, 10 shown in FIGS. 1a & 1b comprise a diverging lens 9 and a converging lens 10. The purpose of lens 9 is to modify the convergence of the beam from the imaging lens 5 in the plane perpendicular to the direction of cut such that the diameter at the cutting lens 10 is increased. As a result, the cutting lens 10 produces a smaller focussed spot in this plane at the substrate. In particular, lens 9 may be an anamorphic lens or a cylindrical diverging lens and lens 10 may be an anamorphic lens or a cylindrical converging lens. This can enable the spot width to be reduced in a direction perpendicular to the cut direction enabling a narrower cut to be produced. Cylindrical lenses are particularly advantageous for this as they do not impact on the scan length as determined by the imaging lens 5.

In the variant of FIG. 1a, during cutting operation the laser beam is directed into the beam deflector 8 by using the scanning unit 4 to direct the beam beyond the normal imaging range. Alternatively, as is shown in the variant of FIG. 1b, the beam deflector 8 may be moved during cutting operation so as to intercept the laser beam. Typically, this movement may comprise tilting or translating the cutting beam deflector 8.

The location of the cutting beam deflector 8 and cut focussing means 9, 10 could be either side of the centre of the field of view and depends on the direction of motion of the substrate. The aperture of the cutting beam deflector 8 and cut focussing means 9, 10 is selected such that they can accommodate the scan required to cut the full width of the substrate 6. Whilst in the above example the cut focussing means 9, 10 are described as lenses the skilled man will appreciate that it is alternatively possible to construct an equivalent arrangement using mirrors which may be cylindrical, parabolic or elliptical in one axis.

In addition to the above, whilst FIGS. 1a & 1b show the scanning unit provided before the imaging lens, it is alternatively possible to provide the imaging lens before the scanning unit. In such circumstances, the cutting beam deflector 8 and cut focussing means 9, 10 are now located after the scanning unit 4.

Figure 2A:
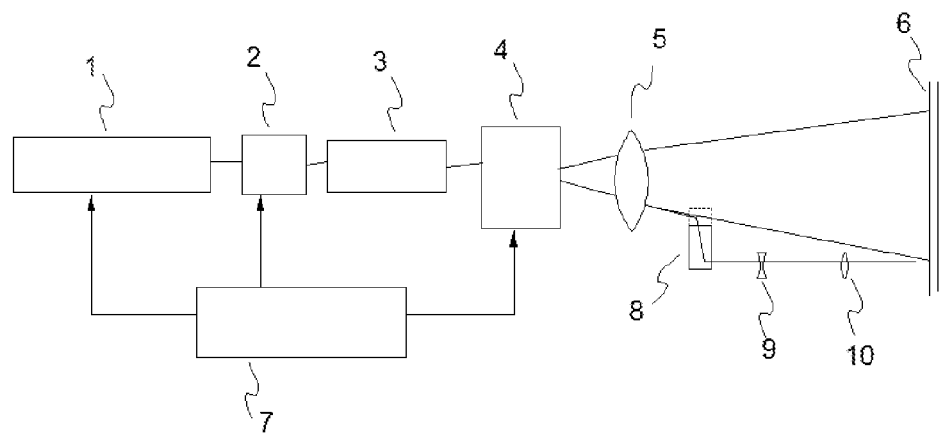
FIG. 2a is a schematic illustration of a second embodiment of an apparatus for imaging and cutting a label according to the present invention.
Figure 2B:
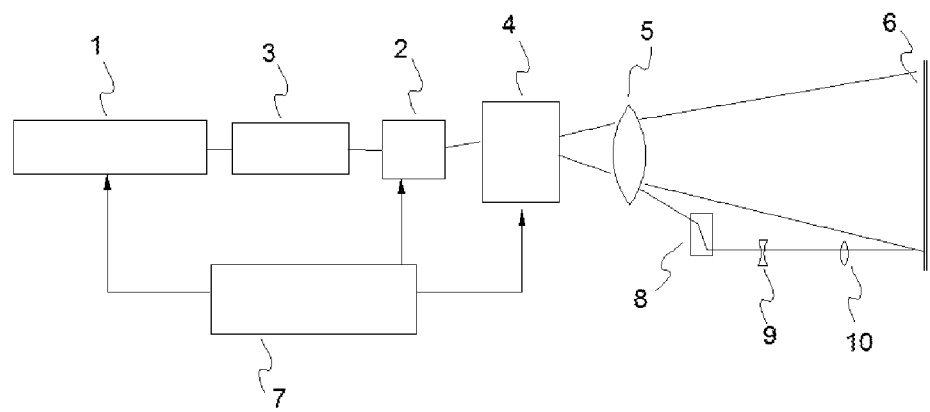
FIG. 2b is a schematic illustration of a variant of the second embodiment of an apparatus for imaging and cutting a label according to the present invention.

Turning now to FIGS. 2a and 2b, two variants on a further embodiment of an apparatus for carrying out imaging and cutting of the label substrate 6 according to the present invention are illustrated schematically. As with the apparatus of FIGS. 1a & 1b, each apparatus comprises a laser 1, beam expander 3, scanning unit 4, and image focussing means 5 and the spot size adjustment means comprise cutting beam deflector 8, and cut focussing means 9, 10. For further control of the beam spot size, the spot size adjustment means in the apparatus of FIGS. 2a & 2b further comprises a high speed deflector 2, typically an acousto-optic (A/O) or electro-optic (E/O) deflector. The high speed deflector may be provided either before (FIG. 2a) or after (FIG. 2b) the optional beam expander 3.

The provision of the high speed deflector 2, provides for improvements in the imaging time for barcodes, bold text, graphics or the like. This is achieved by using the high speed deflector 2 to deflect the beam in a direction substantially perpendicular to the scan direction. Such deflection can increase the effective beam width and thereby reduce the number of scans and hence the time required to image blocks within barcodes, bold text or graphics.

In one implementation, the high speed deflector 2 may be operable to rapidly deflect the beam so as to generate the width of the line required for the bar code or text. In an alternative implementation, the high speed deflector 2 may be operable to rapidly deflect the beam by a preset multiple of the spot diameter. The preset multiple may be determined by the available power and fluence requirements. Typically, the range of deflection may be in the region of 2-4 time the normal spot diameter. In these implementations, the deflection of the laser beam by the high speed deflector may be continuous or it may involve a plurality of indexed steps.

As with the embodiment of FIGS. 1a & 1b, the differing variants of the cutting beam deflector 8 and cut focussing means 9, 10 may be used in relation to the apparatus of FIGS. 2a & 2b. Similarly, as discussed in relation to FIGS. 1a & 1b the order of the scanning unit 4 and imaging lens 5 can be interchanged as required or desired.

Figure 3A:
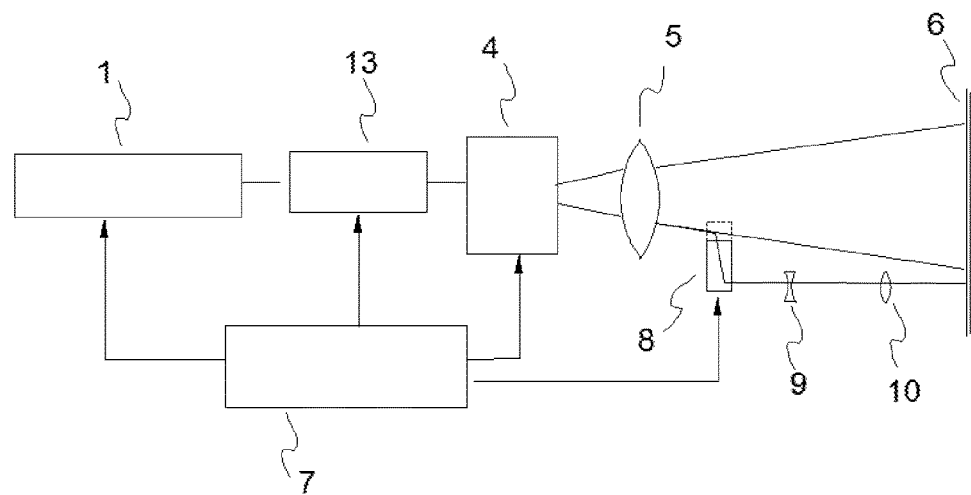
FIG. 3a is a schematic illustration of a third embodiment of an apparatus for imaging and cutting a label according to the present invention.
Figure 3B:
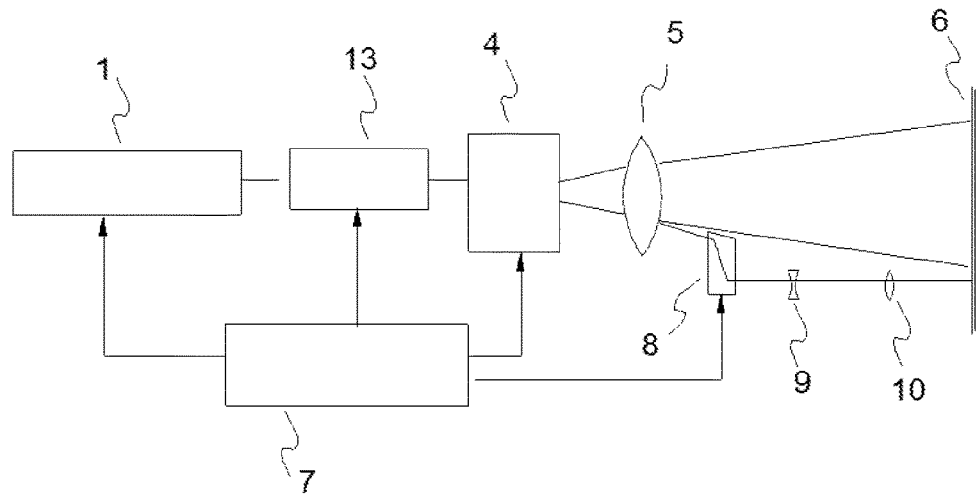
FIG. 3b is a schematic illustration of a variant of the third embodiment of an apparatus for imaging and cutting a label according to the present invention.

Turning now to FIGS. 3a and 3b, two variants on a further embodiment of an apparatus for carrying out imaging and cutting of the label substrate 6 according to the present invention are illustrated schematically. As with the apparatus of FIGS. 1a & 1b, each apparatus comprises a laser 1, scanning unit 4, and image focussing means 5. As with the apparatus of FIGS. 1a & 1b, the variant of FIG. 3a is provided with a cutting beam deflector 8, and cut focussing means 9, 10 of the type provided in FIG. 1a whilst the variant of FIG. 3b is provided with a cutting beam deflector 8, and cut focussing means 9, 10 of the type provided in FIG. 1b. The spot size adjustment means in the apparatus of FIGS. 3a & 3b further comprises a variable beam expander 13 in place of the beam expander 3. The variable beam expander 13 is operable to adjust both the diameter and divergence of the laser beam at the imaging lens 5. The adjustment is made under the control of the controller 7 in response to the action required i.e. imaging a bar code, imaging text or cutting the label. Where the variable beam expander 13 provides a sufficient range of adjustment, it is possible to omit the cutting beam deflector 8 and cut focussing means 9, 10.

The spot size, $d_0$, of the beam focussed by imaging lens 5 may be determined from the equation $$d_0 = \frac{4}{\pi} \frac{\lambda f \cdot M^2}{D_0}$$

Where f is the focal length of lens 5; $\lambda$ is the laser wavelength; $M^2$ is the beam quality parameter; and $D_0$ is the diameter of the laser beam incident upon the lens 5. As such, it is evident that the focussed spot size do is inversely proportional to the laser beam diameter entering imaging lens 5. Accordingly, using the variable beam expander 13 to adjust the diameter of the beam entering the imaging lens 5 can change the focussed spot size. In this context, whilst the major influence on spot size is the beam diameter, beam divergence can have a secondary effect, particularly as the location of the focal position in relation to the imaging lens 5 will depend on the divergence of the incident beam.

In typical text imaging operation the beam may have a standard spot size. For cutting operation the beam should have a reduced spot size. Accordingly, the variable beam expander 13 is adjusted to increase the beam diameter at the imaging lens 5. The variable beam expander is operable to expand the beam diameter by a factor of, say, 1.3 to 2 or preferably by a factor of, say, 2 to 3; or most preferably by a factor in the range 4 to 9. This results in reduction of the spot size at the substrate 6 by an equivalent factor. For imaging barcodes or the like, the beam should have an increased spot size. Accordingly, the variable beam expander 13 is adjusted to reduce the beam diameter at the imaging lens 5. The variable beam expander is operable to reduce the beam diameter by a factor of, say, 1.3 to 2 or preferably by a factor of, say, 2 to 3; or most preferably by a factor in the range 4 to 9. This results in an increase in the spot size at the substrate 6 by an equivalent factor.

In some implementations, the variable beam expander 13 may be operable to adjust the beam dimensions on a single axis only. Preferably, this axis is perpendicular to the scanning direction thereby varying the spot size in this direction for more effective cutting/block imaging as appropriate.

As with the embodiment of FIGS. 1a & 1b, the differing variants of the cutting beam deflector 8 and cut focussing means 9, 10 may be used in relation to the apparatus of FIGS. 3a & 3b. Similarly, as discussed in relation to FIGS. 1a & 1b the order of the scanning unit 4 and imaging lens 5 can be interchanged as required or desired.

Figure 4:
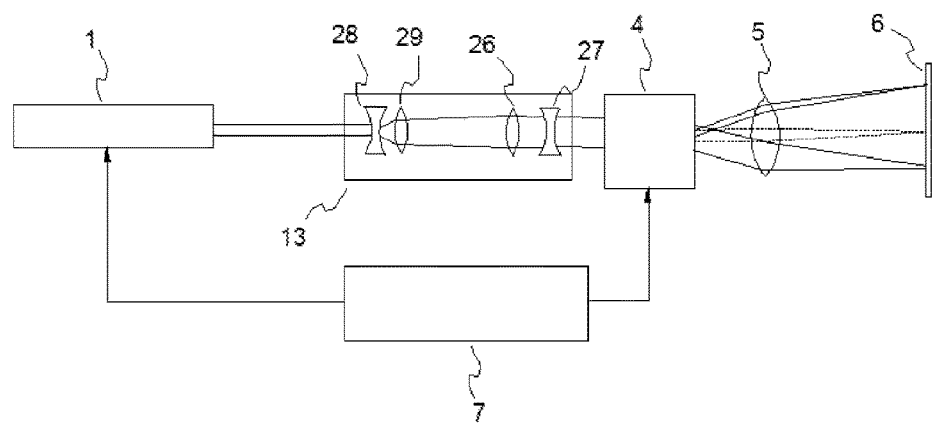
FIG. 4 is a schematic illustration of a variant of the third embodiment of an apparatus for imaging and cutting a label according to the present invention, including a schematic illustration of the optical elements of a variable beam expander.

Turning now to FIG. 4, a schematic illustration of a variable beam expander 13 in use in an apparatus according to the present invention is shown. In this example, the variable beam expander 13 comprises a pair of lenses 28, 29 operable to increase the divergence of the incoming laser beam and a pair of lenses 26, 27 operable to reduce the divergence and substantially re-collimate the beam. Adjustment of the separation between the lenses 28, 29 allows for variation in the divergence provided by the first lens pair. Adjustment of the separation between the lenses 26, 27 provides variable control over the divergence of the beam entering the imaging lens 5. Therefore the effective focal length of lens pair 28, 29 set the magnification and lens pair 26, 27 control the divergence and hence location of the focal plane. It is also possible to adjust the separation between the lens pair 28, 29 and the lens pair 26, 27 to provide further control.

Whilst the above configuration of the variable beam expander 13 includes two lens pairs 28, 29 and 26, 27 the skilled man will appreciate that other combinations of multiple lenses (including two pairs of converging lenses), deformable lenses or mirrors could achieve the same result.

As with the embodiment of FIGS. 1a & 1b, the differing variants of the cutting beam deflector 8 and cut focussing means 9, 10 may be used in relation to the apparatus of FIG. 4. Similarly, as discussed in relation to FIGS. 1a & 1b the order of the scanning unit 4 and imaging lens 5 can be interchanged as required or desired.

Figure 5:
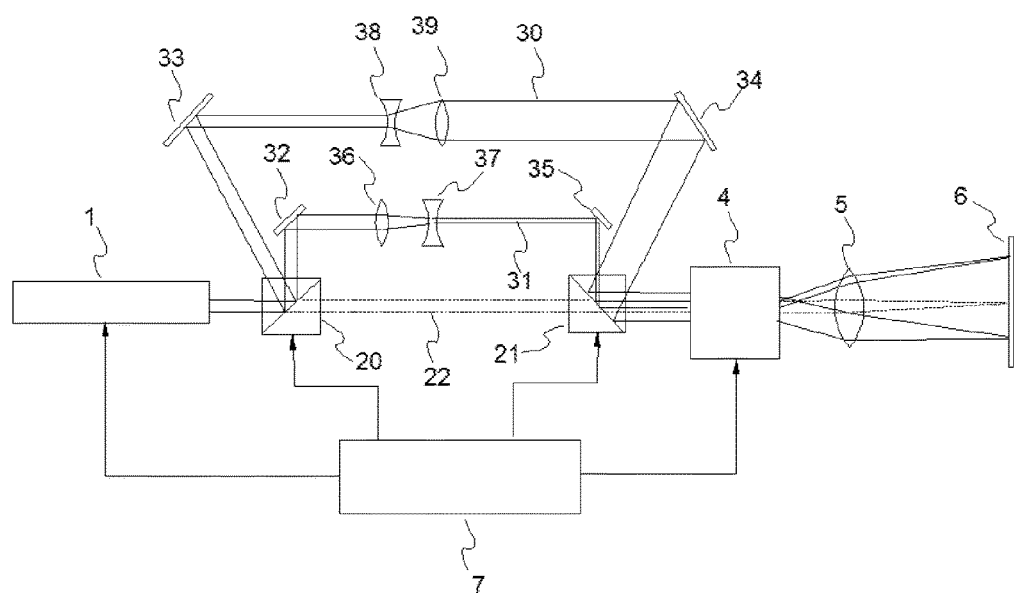
FIG. 5 is a schematic illustration of a fourth embodiment of an apparatus for imaging and cutting a label according to the present invention.

Turning now to FIG. 5, a further embodiment is illustrated. In this embodiment, the apparatus is provided with indexable beam deflectors 20, 21 operable to deflect the laser beam into multiple different optical pathways 22, 30, 31. Typically, the indexable deflectors 20, 21 may comprise galvanometer scanning mirrors, electro optical or acousto-optical means, or microelectromechanical (MEMS) means as desired or as appropriate.

Each pathway 22, 30, 31 comprises one or more optical elements operable to vary the beam diameter and/or divergence. For instance, optical pathway 22 comprises no additional optical elements and does not vary the beam diameter. Accordingly, this provides a standard size spot for imaging operation. If necessary, the skilled man will appreciate that an optional beam expander 3 may be provided as part of optical pathway 22 to achieve a desired spot size.

Optical pathway 30 comprises mirror 33 operable to direct the beam from deflector 20 into beam expanding lens pair 38, 39 and a mirror 34 operable to direct the beam from the lens pair 38, 39 back to deflector 21. As such, the beam incident on scanning unit 4 and imaging lens 5 is of greater diameter and hence can be focussed to a reduced spot size for cutting operation.

Optical pathway 31 comprises mirror 32 operable to direct the beam from deflector 20 into beam expanding lens pair 36, 37 and a mirror 35 operable to direct the beam from the lens pair 36, 37 back to deflector 21. As such, the beam incident on scanning unit 4 and imaging lens 5 is of reduced diameter and hence can be focussed to a larger spot size spot size for imaging barcodes or the like.

In alternative embodiments, the skilled man will appreciate that the indexable deflectors 20, 21 need not be external to the beam expanders as shown in FIG. 5 but could be integrated with a variable beam expander.

In some implementations, the alternative optical pathways 30, 31 may comprise optical elements operable to adjust the beam dimensions on a single axis only. Preferably, this axis is perpendicular to the scanning direction thereby varying the spot size in this direction for more effective cutting/block imaging as appropriate.

As with the embodiment of FIGS. 1a & 1b, the differing variants of the cutting beam deflector 8 and cut focussing means 9, 10 may be used in relation to the apparatus of FIG. 5. Similarly, as discussed in relation to FIGS. 1a & 1b the order of the scanning unit 4 and imaging lens 5 can be interchanged as required or desired.

In a preferred implementation, the laser 1 is a CO2 laser which has been surprisingly found to enables the formation of clear printed images through release layer. Furthermore, the output of a CO2 laser is readily absorbed by the base layer of the substrate 6. As such, the same laser 1 may be used for both imaging and cutting. Surprisingly, it has been found that use of the same laser to print an image and cut the substrate 6 does not result in significant discolouration at the cut edge of the substrate 6.

Typically, the normal CO2 laser wavelength is around 10.6 μm and this is absorbed by many polymeric films and is adequate for cutting. However, this operating wavelength may be tuned for optimum absorption in the base layer as this can reduce the laser fluence required for cutting. In the case of a polypropylene base layer, the absorption of polypropylene is significantly higher at 9.3 μm and 10.3 μm than it is at the usual operating wavelength for a CO2 laser (10.6 μm). Accordingly, it is desirable, but not essential, to select an operating wavelength from the so called 'P' and 'R' vibrational bands of the CO2 molecule at 9.4 μm and 10.4 μm respectively.

The skilled man will note that whilst Galilean configurations of lens pairs/beam expanders are used in the examples shown in the figures, it is alternatively possible to use Keplerian or other configurations, where appropriate.

The above embodiments are described by way of example only. Many variations are possible without departing from the scope of the invention as defined in the appended claims.

The invention claimed is:

1. A label printing and cutting apparatus suitable for use with a strip of label substrate, the strip of label substrate comprising a colour change layer in which a printed image may be formed, the label printing and cutting apparatus comprising: the strip of label substrate; an imaging area; and laser illumination means operable to selectively illuminate the strip of label substrate in the imaging area so as to induce colour change in the colour change layer thereby forming the printed image, the laser illumination means further operable to cut the label substrate and characterised in that the laser illumination means comprises laser spot size adjustment means operable to vary the spot size of the laser for imaging and for cutting, wherein the laser spot adjustment means comprises an image focusing means and at least one anamorphic lens, the at least anamorphic lens being placed between the image focusing means and the label substrate and the laser spot size adjustment means comprise a cutting beam deflector operable to deflect the beam from a scanning unit through a cut focussing means.

2. An apparatus as claimed in claim 1 wherein the apparatus comprises a label applicator operable to apply a cut and printed label to an object.

3. An apparatus as claimed in claim 1 wherein the spot size adjustment means comprise a high speed beam deflector provided between the laser illumination means and the scanning unit.

4. An apparatus as claimed in claim 1 wherein the spot size adjustment means comprises one or more indexable beam deflectors operable to deflect the beam emitted from the laser illumination means into a selected one of multiple optical pathways, each pathway comprising one or more optical elements operable to vary the beam diameter and/or divergence.

5. An apparatus as claimed in claim 1 wherein the laser illumination means has an operating wavelength in the range 200 nm to 20 µm.

6. An apparatus as claimed in claim 1 wherein the substrate comprises a base layer having an adhesive layer provided on one side and the colour change layer covered by a release layer on the other side; or wherein the substrate comprises a base layer having a release layer provided on one side and the colour change layer covered by an adhesive layer on the other side.

7. An apparatus as claimed in claim 1 wherein the spot size adjustment means comprise a variable beam expander operable to controllably vary the diameter and/or divergence of the beam provided to the scanning unit.

8. An apparatus as claimed in claim 1 wherein the apparatus is provided with a cut focusing means operable to reduce the spot size in one dimension only.

9. An apparatus as claimed in claim 8 wherein the cut focusing means comprise cylindrical lenses.

10. An apparatus as claimed in claim 1 wherein the laser illumination means is provided with a scanning unit operable to direct the generated laser beam onto selected areas of the substrate for printing and/or cutting.

11. An apparatus as claimed in claim 1 wherein the apparatus is provided with a beam expander positioned between the laser illumination means and the scanning unit.

* * * * *